United States Patent
Gallucci et al.

(10) Patent No.: US 6,300,399 B1
(45) Date of Patent: Oct. 9, 2001

(54) HIGH SPECIFIC GRAVITY POLYESTER BLEND

(75) Inventors: Robert R. Gallucci, Mt. Vernon; Galina D. Georgieva; Vinod R. Sastri, both of Evansville, all of IN (US)

(73) Assignee: General Electric Company, Pittsfield, MA (US)

( * ) Notice: Subject to any disclaimer, the term of this patent is extended or adjusted under 35 U.S.C. 154(b) by 0 days.

(21) Appl. No.: 09/442,447

(22) Filed: Nov. 18, 1999

Related U.S. Application Data

(60) Provisional application No. 60/151,228, filed on Aug. 27, 1999.

(51) Int. Cl.$^7$ .......................................... G08J 5/04
(52) U.S. Cl. ........................... 524/398; 524/439; 524/440
(58) Field of Search ................................... 524/398, 413, 524/435, 439, 440

(56) References Cited

U.S. PATENT DOCUMENTS

| | | |
|---|---|---|
| 2,465,319 | 3/1949 | Whinfield et al. . |
| 3,047,539 | 7/1962 | Pengilly . |
| 3,663,653 | 5/1972 | Frohlich et al. . |
| 3,671,487 | 6/1972 | Abolins . |
| 3,775,373 | 11/1973 | Wolfe, Jr. . |
| 3,801,547 | 4/1974 | Hoeschele . |
| 3,932,344 * | 1/1976 | O'Day, Jr. et al. ..................... 260/38 |
| 4,122,061 | 10/1978 | Holub et al. . |
| 4,670,203 * | 6/1987 | Chang ................... 264/40.6 |
| 5,122,551 | 6/1992 | Gallucci et al. . |
| 5,132,353 | 7/1992 | Wallace . |
| 5,149,734 | 9/1992 | Fisher et al. . |
| 5,191,000 * | 3/1993 | Fuhr et al. ........................... 524/117 |
| 5,236,979 * | 8/1993 | Chiolle et al. ....................... 524/120 |
| 5,441,997 | 8/1995 | Walsh et al. . |
| 5,503,934 | 4/1996 | Maas et al. . |
| 5,616,642 | 4/1997 | West et al. . |
| 5,885,497 | 3/1999 | Maas et al. . |
| 5,976,998 * | 11/1999 | Sandor et al. ....................... 442/365 |

FOREIGN PATENT DOCUMENTS

| | | |
|---|---|---|
| 523599 * | 1/1993 | (EP) . |
| 03215563 | 9/1991 | (JP) . |
| 0331277 | 6/2000 | (JP) . |

* cited by examiner

*Primary Examiner*—Edward J. Cain
*Assistant Examiner*—Katarzyna Wyrozebski-Lee

(57) ABSTRACT

A filled polyester molding composition which, based on the weight of the total composition, comprises (a) from about 5 to about 40 weight percent of a polyester resin; (b) from about 60 to about 95 percent of tungsten metal filler; and (c) from 0 to 20 weight percent of an impact modifier with a specific gravity greater than about 3.0 g./cc.

1 Claim, No Drawings

HIGH SPECIFIC GRAVITY POLYESTER BLEND

This application claims rights of priority from U.S. Provisional Patent Application Ser. No. 60/151,228, filed Aug. 27, 1999, which is hereby incorporated by reference.

FIELD OF THE INVENTION

This invention relates to filled polyester molding compositions having very high specific gravity and enhanced properties.

BACKGROUND OF THE INVENTION

Filled crystalline resin blends typically have less than desirable impact properties. In addition it is difficult to prepare materials with a specific gravity greater than or equal to about 3.0 g./cc with good mechanical properties. In order to mimic articles made of heavy metals, such as zinc or steel, with a very heavily filled polyester resin it is also important that molded crystalline resin part have a smooth surface which can be easily plated using standard plating processes.

Holub et al, U.S. Pat. No. 4,122,061 describes polyester reinforced blends of poly(1,4-butylene terephthalate) and poly(ethylene terephthalate) impact modified with the addition of a polyolefin or olefin based copolymer resin. The polyolefinic resin is dispersed into the polyester blend and used for injection molding. Workpieces molded from such polyester resins are described as having a high degree of surface hardness and abrasion resistance, high gloss, and lower surface friction. It is desirable to provide further enhancements to the properties of resins of the type described in Holub et al.

U.S. Pat. No. 5,132,353 to Wallace describes a blend of thermoplastic polyester with from 50–75% zinc oxide. While the blends have useful mechanical properties and good surface appearance, specific gravity is below 3.0 g./cc. Similarly U.S. Pat. No. 5,149,734 to Fisher et al. describes polyester blends with 30–75% barium sulfate with ceramic like feel and density. In this case again specific gravity is below 3.0 g./cc, well below that of most metals. In both of the above patents no mention is made of metal plating.

U.S. Pat. No. 5,441,997 describes polyester molding compositions which have ceramic like qualities and high impact strength which can be easily molded. The composition is directed to a polybutylene terephthalate and/or polyethylene terephthalate and an aromatic polycarbonate with inorganic fillers selected from the group consisting of barium sulfate, strontium sulfate, zirconium oxide and zinc sulfate. If desired, a styrene rubber impact modifier can be added to the composition as well as a fibrous glass reinforcing filler. Although these compositions are suited for applications where ceramic like qualities are desired, it is desirable to achieve even higher densities while retaining desirable properties for molding.

Metal plating of plastics has been an area of study for many years and metal plated plastic articles are sold in a variety of applications: for instance, truck and automobile parts, appliances, electronic equipment, toys, handles, lighting reflectors and personal grooming equipment. As seen in U.S. Pat. Nos. 5,503,94 and 5,885,497 small changes in polymer structure, described as the presence of some aryl ester units in a polycarbonate copolymer, can have a major effect on plating. Plating and metalization of plastic articles still has a large element of unpredictability.

It is desirable to obtain an impact resistant polyester resin having a high specific gravity and enhanced plating properties. Additionally, it is desirable to achieve a smooth surface important to the final appearance of a metal plated article. Hence, it is desirable to provide improved resins containing additional ingredients which can enhance the above properties without detracting from desirable surface properties which can contribute to good appearance and plateability.

SUMMARY OF THE INVENTION

In the compositions of the present invention it is desirable have high specific gravity with enhanced impact resistance as well as desirable surface properties.

According to the present invention, there is provided a filled polyester molding composition, based on the weight of the total composition, comprising (a) from about 5 to about 40 weight percent of a polyester resin; (b) from about 60 to about 95% weight percent of tungsten metal filler; and (c) optionally from 0 to 20 weight percent of an impact modifier.

The composition of the present invention desirably has a relatively high specific gravity as compared to other materials having similar additions of other filler materials. Preferably, the resulting specific gravity is greater than 3.0 g./cc. With the molded part having good melt processability, good practical impact, a smooth surface as molded and good metal plateability.

DESCRIPTION OF THE PREFERRED EMBODIMENTS

A high specific gravity molding composition preferably comprises (a) from about 5 to about 40 weight percent of a thermoplastic polyester resin; (b) from about 60 to about 95 percent of tungsten metal filler; and (c) optionally from 1 to 10 weight percent of an impact modifier. Polyester components include crystalline thermoplastic polyesters such as polyesters derived from an aliphatic or cycloaliphatic diol, or mixtures thereof, containing from 2 to about 10 carbon atoms and at least one aromatic dicarboxylic acid. Preferred polyesters are derived from an aliphatic diol and an aromatic dicarboxylic acid having repeating units of the following general formula:

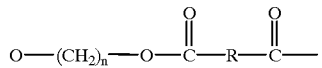

wherein n is an integer of from 2 to 6. R is a C6–C20 aryl radical comprising a decarboxylated residue derived from an aromatic dicarboxylic acid.

Examples of aromatic dicarboxcylic acids represented by the decarboxylated residue R are isophthalic or terephthalic acid, 1,2-di(p-carboxyphenyl)ethane, 4,4'-dicarboxydiphenyl ether, 4,4' bisbenzoic acid and mixtures thereof. All of these acids contain at least one aromatic nucleus. Acids containing fused rings can also be present, such as in 1,4-1,5- or 2,6-naphthalene dicarboxylic acids. The preferred dicarboxylic acids are terephthalic acid, isophthalic acid, naphthalene dicarboxylic acid or mixtures thereof.

The most preferred polyesters are poly(ethylene terephthalate) ("PET"), and poly(1,4-butylene terephthalate), ("PBT"), poly(ethylene naphthanoate) ("PEN"), poly(butylene naphthanoate), ("PBN"), (polypropylene terephthalate) ("PPT") and poly (cyclohexanedimethanol terephthalate) ("PCT").

Also contemplated herein are the above polyesters with minor amounts, e.g., from about 0.5 to about 5 percent by weight, of units derived from aliphatic acid and/or aliphatic polyols to form copolyesters. The aliphatic polyols include glycols, such as poly(ethylene glycol). Such polyesters can be made following the teachings of, for example, U.S. Pat. Nos. 2,465,319 and 3,047,539.

The preferred poly(1,4-butylene terephthalate) resin used in this invention is obtained by polymerizing a glycol component at least 70 mol %, preferably at least 80 mol %, of which consists of tetramethylene glycol and an acid component at least 70 mol %, preferably at least 80 mol %, of which consists of terephthalic acid, and polyester-forming derivatives thereof.

The polyesters used herein have an intrinsic viscosity of from about 0.4 to about 2.0 dl/g as measured in a 60:40 phenol/tetrachloroethane mixture or similar solvent at 23–30° C. VALOX Registered TM 315 polyester is particularly suitable for this invention.

The preferred polyester of the invention will be crystalline polyesters having a melting point from 150 to 300° C. with the most preferred polyester melting between 180 and 250° C.

In order to improve the as molded surface of an article of the invention it is preferred to combine a fast crystallizing resin like PBT with a slower crystallizing resin like PET. In these type of polyester blends the most preferred compositions have a 1:1 to 3:1 ratio of PBT to PET.

The tungsten metal filler comprises particles of tungsten metal. Tungsten powder is typically produced by carbon reduction techniques known in the art. Tungsten is an especially useful filler for this invention due to its very high gravity. Other key attributes are its low toxicity, compared to lead, mercury, uranium and cadmium, which allows its use without harmful emissions to the environment or costly manufacturing measures to prevent its potential release to the environment. Tungsten is also much less costly than other metals such as palladium, platinum, gold or silver. Tungsten is also very inert to water and strong mineral acids, is not easily oxidized at polyester process temperatures (generally below 300° C.) and does not degrade the polyester resins through chemical reaction as would basic high gravity compounds such as ammonium paratungstate.

It is also important to use a tungsten metal powder of a particle size appropriate to achieve good mechanical properties in the polyester matrix. Tungsten particle sizes of from 0.5–50 microns can be used but particle sizes below 30 microns are preferred while particles below 10 microns are most preferred.

A polyester resin molding composition of the invention will contain said tungsten present in an amount sufficient to result in the molding composition having a specific gravity greater than about 3.0 g/cc. Tungsten content will be from about 60 to 95% by weight of the entire mixture, preferably from 65–85%. The most preferred compositions have a specific gravity from 4.0 to 5.0 g./cc.

The composition of the present invention may include additional components which do not interfere with the previously mentioned desirable properties.

The composition may optionally contain impact modifiers such as a rubbery impact modifier. Preferably such impact modifiers are utilized in an amount less than about 20%, and preferably less than about 10% and most preferably less than about 5%. Typical impact modifiers are derived from one or more monomers selected from the group consisting of olefins, vinyl aromatic monomers, acrylic and alkylacrylic acids and their ester derivatives as well as conjugated dienes. Impact modifiers include the rubbery high-molecular weight materials including natural and synthetic polymeric materials showing elasticity at room temperature. They include both homopolymers and copolymers, including random, block, radial block, graft and core-shell copolymers as well as combinations thereof.

Suitable modifiers include core-shell polymers built up from a rubber-like core on which one or more shells have been grafted. The core typically consists substantially of an acrylate rubber or a butadiene rubber. One or more shells typically are grafted on the core. The shell preferably comprises a vinylaromatic compound and/or a vinylcyanide and/or an alkyl(meth)acrylate. The core and/or the shell(s) often comprise multi-functional compounds which may act as a cross-linking agent and/or as a grafting agent. These polymers are usually prepared in several stages.

Olefin-containing copolymers such as olefin acrylates and olefin diene terpolymers can also be used as impact modifiers. An example of an olefin acrylate copolymer impact modifier is ethylene ethylacrylate. Other higher olefin monomers can be employed in copolymers with alkyl acrylates, for example, propylene and n-butyl acrylate. The olefin diene terpolymers are well known in the art and generally fall into the EPDM (ethylene propylene diene) family of terpolymers.

Polyolefins such as polyethylene, polyethylene copolymers with alpha olefins are also typical modifiers. Polyolefin copolymers with glycidyl acrylates or methacrylates are included.

Polyolefins may be high density polyethylene (d=above 0.94) low density polyethylene (d=about 0.92) linear low density polyethylene (d=0.916–0.940) or polypropylene. The olefin polymers may be copolymers, including ethylene-propylene copolymers and those containing acid or ester structural units derived, for instance, from acrylic acid, methacrylic acid, acrylic esters, meth acrylic esters, ethyl acrylate, alkyl vinyl esters or the like, most often in the amount of about 5–25%, preferably 10–25 percent by weight. Typical are copolymers of ethylene with ethyl acrylate or meth acrylate.

Styrene-containing polymers can also be used as impact modifiers. Examples of such polymers are acrylonitrile-butadiene-styrene (ABS), acrylonitrile-butadiene-methylstyrene, styrene-butadiene, styrene butadiene styrene (SBS), styrene ethylene butylene styrene (SEBS), methacrylate-butadiene-styrene (MBS), and other high impact styrene-containing polymers.

The most preferred impact modifier is PEE, a poly(ether ester). The making of block copolyester ethers of this kind has been described in U.S. Pat. Nos. 3,663,653, 3,775,373 and 3,801,547. U.S. Pat. No. 5,122,551 describes a variety of fiber glass filled poly(ether esters) and various related polyester block copolymers and is herein incorporated by reference. The preferred poly(ether esters) polymer may typically comprise a poly(butylene terephthalate) hard block and a poly tetramethylene glycol soft block. A commercially available copolymer of this kind is a thermoplastic elastomer sold by DuPont under the trademark "HYTREL". The HYTREL 4056 used for the examples is a block copolyether ester sold by DuPont Co.

The resin mixture typically comprises additional ingredients which may be added to contribute to desirable properties previously mentioned which include good mechanical properties, color stability, oxidation resistance, good flame retardancy, good processability, i.e. short molding cycle times, good flow and easy release from a mold, and good metal plateability.

It may be desirable to use tungsten in combination with other fillers and reinforcements such as fiber glass, clay, talc, metal oxides, metal sulfates, especially barium sulfate, glass beads, wollastonite and similar materials.

Preferred antioxidants used in the tungsten filled polyester compositions are hindered phenols, phosphites, phosphonites and thioesters. They are generally used at less than 1.0 and preferably less than 0.5% by weight of the entire mixture. They may be used alone or more preferably in combination with each other.

Typical flame retardant compounds that may optionally be used in the compositions of the invention include any of the conventional halogenated aromatic flame retardants such as: decabromodiphenyl ether, brominated phthalimides, brominated polyphenylene ethers, bromine containing polyacrylates or methacrylates, i.e., polypentabromobenzyl acrylate and/or brominated styrene polymers. These are well known to those skilled in the art and are described in the patent literature. Preferred are derivatives of tetrabromo bisphenol A, such as its polycarbonate polymer or the polymer of its adduct with epichlorohydrin (brominated phenoxy resin). They may be used alone, or in conjunction with a synergist, particularly inorganic antimony compounds. Such compounds are widely available or can be made in known ways. Especially preferred is antimony trioxide.

Flame retardant embodiments of the present invention may further comprise a drip retardant agent to retard dripping during burning. Such compounds are known to those skilled in the art and include, but are not limited to, various fluorinated polymers. Particularly useful is polytetrafluoroethylene (PTFE). See, e.g., Wambach, U.S. Pat. No. 3,671, 487.

The preferred composition of the invention will have the following proportions of ingredients:
(a) 65–80% tungsten powder
(b) 14–35% of a poly alkylene phthalate or mixture of poly alkylene phthalates.
(c) 1–5% of a poly(ether ester) block copolymer.
(d) 0–1.0% of a stabilizer selected from the group consisting of: hindered phenols, phosphites, phosphonites and thioesters.

The method of blending the compositions can be carried out by conventional techniques. One convenient method comprises blending the polyester and tungsten powder and other ingredients in powder or granular form, extruding the blend under temperature sufficient to melt the polyester and comminuting into pellets or other suitable shapes. The ingredients are combined in any usual manner, e.g., by dry mixing or by mixing in the melted state in an extruder, on a heated mill or in other mixers.

Although it is not essential, best results are obtained if the ingredients are pre-compounded, pelletized and then molded. Pre-compounding can be carried out in conventional equipment. For example the polyester resin, the tungsten powder, and, optionally, other additives and/or reinforcements can be added to the throat of a single screw extruder having a mixing screw with a long transition section to insure proper melting. On the other hand, a twin screw extrusion machine can be fed with resins and additives at the feed port and a portion of the tungsten powder down stream. Other compounding variations are within the scope of this invention.

The pre-compounded composition can be extruded and cut or chopped into molding compounds, such as conventional granules, pellets, etc. by standard techniques.

Despite the high gravity and high level of filler the compositions of the invention can be molded in any standard equipment conventionally used for thermoplastic compositions. For example, good results will be obtained in an injection molding machine, e.g. of the 80 ton Van Dorn type, with conventional temperatures which depend on the particular thermoplastic utilized. If necessary, depending on the molding properties of the polyester, the amount of additives and/or reinforcing filler and the rate of crystallization of the polyester component, those skilled in the art will be able to make the conventional adjustments in molding cycles to accommodate the composition.

EXAMPLES

The formulations set forth in tables 1 and 2 were pre-blended and extruded on a 2.5 in. vacuum vented single screw extruder at 250° C. with a 100 rpm screw speed. The extrudate was cooled through a water bath prior to pelletizing. Test parts were injection molded at 250° C. The resin was dried prior to injection molding.

Properties were tested using standard ASTM methods.

Blends of polyester resin having a specific gravity greater than 3.0 g./cc were made as set forth in the examples. The resulting molded articles had good surfaces, good impact properties, and acceptable plateability. The plated article showed a smooth glossy surface largely free of defects with good adhesion of the metal to the polymer substrate. Addition of a poly(ether ester) gave the best overall metal plating in terms of adhesion and appearance with surprisingly good flexibility and ductility.

Injection molded parts were plated as follows: pasts were cleaned with hot caustic, etched with a mineral acid, neutralized with caustic. A layer of electroless nickel metal was deposited using a stannous chloride palladium catalyst system. Other metals layers can be deposited on the first metal layer. The examples of the invention used a copper middle layer and a chromium outer layer. Metal Plating quality was rated as follows:
Good=Glossy coating with regions of good adhesion, some minor blisters and visible flow lines
Better=Glossy coating, overall good adhesion, no blisters, visible flow lines
Best=Glossy costing, overall good adhesion, no blister, few or no visible flow lines

EXAMPLES 1–4

(Table 1)

The examples of table 1 show high gravity bends of tungsten powder with PBT, PET and PEE, acrylic rubber and a high rubber graft ABS impact modifiers. All show unnotched Izod values over 10 ft-lbs./in. with good metal plating.

TABLE 1

Examples 1–4 Polyester Blends with High Gravity and Good Impact

| Examples | 1 | 2 | 3 | 4 |
| --- | --- | --- | --- | --- |
| Tungsten Powder | 80 | 74 | 80 | 81 |
| PBT | 11.4 | 13.8 | 7.5 | 15 |
| PET | 6 | 5 | 4.8 | 0 |
| Impact Modifier | 2.5 PEE | 5.0 Acrylic | 5.0 HRG-ABS/2.5 PEE | 3.7 HRG-ABS |
| A.O. | 0.1 | 0.2 | 0.2 | 0.3 |
| Specific Gravity | 5.1 | 4.4 | 4.8 | 5.1 |
| Metal Plating | Best | Better | Better | Better |
| Unnotched Izod ft-lbs/in. | 27 | 22 | 23 | 17 |
| Tm ° C. | 218/248 | 218/248 | 218/248 | 218/248 |

Tungsten Average Particle Size 3.4 microns
PEE = Dupont HYTREL 4056
Acrylic = Rohm & Haas EXL3330
HRG-ABS = GE BLENDEX 338
A.O. = Hindered phenol aryl phosphite combinations
Tm = peak melting temperature(s) as determined by DSC Metal Plated Injection Molded Part with a Ni Inner/Cu Middle/Cr Outer Metal Coating
Good=Glossy coating with regions of good adhesion, some minor blisters and visible flow lines
Better=Glossy coating, overall good adhesion, no blisters, visible flow lines
Best=Glossy costing, overall good adhesion, no blister, few or no visible flow lines

EXAMPLES 5–11

(Table 2)

The examples of table 2 show high gravity bends of tungsten powder with PBT (Ex.5) PBT: PET blend (Ex.6) and several impact modifiers. All examples show specific gravity above 4.8 g./cc with good metal plating performance. Note the improved Izod impact achieved in examples 7–11 using PEE, HRG-ABS or acrylic rubber impact modifiers.

TABLE 2

Examples 5–11 Tungsten Filled Polyester Blends

| Examples | 5 | 6 | 7 | 6 | 9 | 10 | 11 |
|---|---|---|---|---|---|---|---|
| Tungsten Powder | 80 | 80 | 82 | 80 | 80 | 80 | 80 |
| PBT | 19.7 | 12.7 | 8.7 | 9.7 | 16.5 | 9.7 | 9.7 |
| PET | 0 | 7 | 4 | 5 | 0 | 5 | 5 |
| Impact Modifier | 0 | 0 | 5.0 PEE | 5.0 PEE | 3.2 HRG-ABS | 5.0 HRG-ABS | 5.0 Acrylic |
| A.O. | 0.3 | 0.3 | 0.3 | 0.3 | 0.3 | 0.3 | 0.3 |
| Specific Gravity | 5.1 | 5.1 | 5.3 | 5.0 | 4.9 | 4.8 | 4.9 |
| Metal Plating | Good | Good | Best | Best | Better | Better | Better |
| Un/notched Izod ft-lbs/in. | 9 | 10 | 12 | 17 | 1.3 NI | 15 | 16 |
| Tm ° C. | 218 | 218/247 | 218/247 | 218/247 | 218 | 218/247 | 218/247 |

Tungsten Average Particle Size 3.4 microns Tm = peak melting temperature as determined by DSC
PEE = Dupont HYTREL 4056
Acrylic = Rohm & Haas EXL3330
HRG-ABS = GE BLENDEX 338
A.O. = 0.2% Ciba Geigy IRGANOX 1098/0.1% Clairant PEPQ
NI = Notched Izod

What is claimed is:

1. A metal plated filled polyester molded composition comprising: a molded composition consisting essentially of (a) 65–80% tungsten powder, (b) 14–35% of a polyalkylene terephthalate, (b) 1–5% of a poly(ether ester) block copolymer, (c) 0–1.0% of a stabilizer selected from the group consisting of hindered phenols, phosphites, phosphonites and thioesters, and a nickel layer plated on the said molded composition, said polyalkylene terephthalate comprises a poly(1,4-butylene terephthalate) and a poly(ethylene terephthalate) in ratio 1:1 to 3:1 of said poly(1,4-butylene terephthalate) to said poly(ethylene terephthalate).

* * * * *